Oct. 7, 1958  L. D. EDGAR  2,855,157
MATERIAL PULVERIZER
Filed July 18, 1955  2 Sheets-Sheet 1

Leonard D. Edgar
INVENTOR.

Oct. 7, 1958 — L. D. EDGAR — 2,855,157
MATERIAL PULVERIZER
Filed July 18, 1955 — 2 Sheets-Sheet 2

Leonard D. Edgar
INVENTOR.

United States Patent Office 2,855,157
Patented Oct. 7, 1958

2,855,157

MATERIAL PULVERIZER

Leonard D. Edgar, Poplar Bluff, Mo.

Application July 18, 1955, Serial No. 522,693

2 Claims. (Cl. 241—92)

This invention relates generally to grinding and pulverizing apparatus and is more particularly concerned with a novel rotary suction operated pulverizer-grinder for attaining a finely ground material usable for fertilizer, animal food and insulation base material, etc.

The novel grinder involved in this invention is to be used on heretofore classified waste products aiding in deterring the evolution of the boll pink worm and boll weevil, etc., by grinding the worm, weevil and their eggs etc., which are left on the boll and the stalks of the plant. The improved grinder may be used for grinding infested corn, beans, small grain, etc., and can be classed as a larva exterminator for destroying larva pertaining to the various mentioned plants. The grinder is usable for all materials that are subject to pulverization whereby the aforementioned insect life may be destroyed. The novel grinder will be especially utilitarian in agricultural areas wherein various waste products of plants after the harvest or after the plants have become infested with insect life have heretofore been destroyed, and would thus be instrumental in supplying a raw material giving rise to new industries such as the manufacture of fertilizers, and insulating panels.

A primary object of invention in conformance with that set forth above is to provide a pulverizer-grinder housing including inlet and outlet portions operatively connected to suction source, a plurality of fixed cutter apertured portions alignable with high speed rotary cutter aperture portions, and means for adjusting the relative distance between said cutter aperture portions.

A further object of invention in conformance with that set forth above is to provide in a rotary high speed pulverizer-grinder of the character set forth, means for absorbing shock between the respective cutter portions as well as means for absorbing sudden torque in starting of the rotary cutter portion.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is an enlarged sectional view taken substantially on line 4—4 of Figure 1; and Figure 5 is a sectional view taken substantially on line 5—5 of Figure 4.

Figure 1:
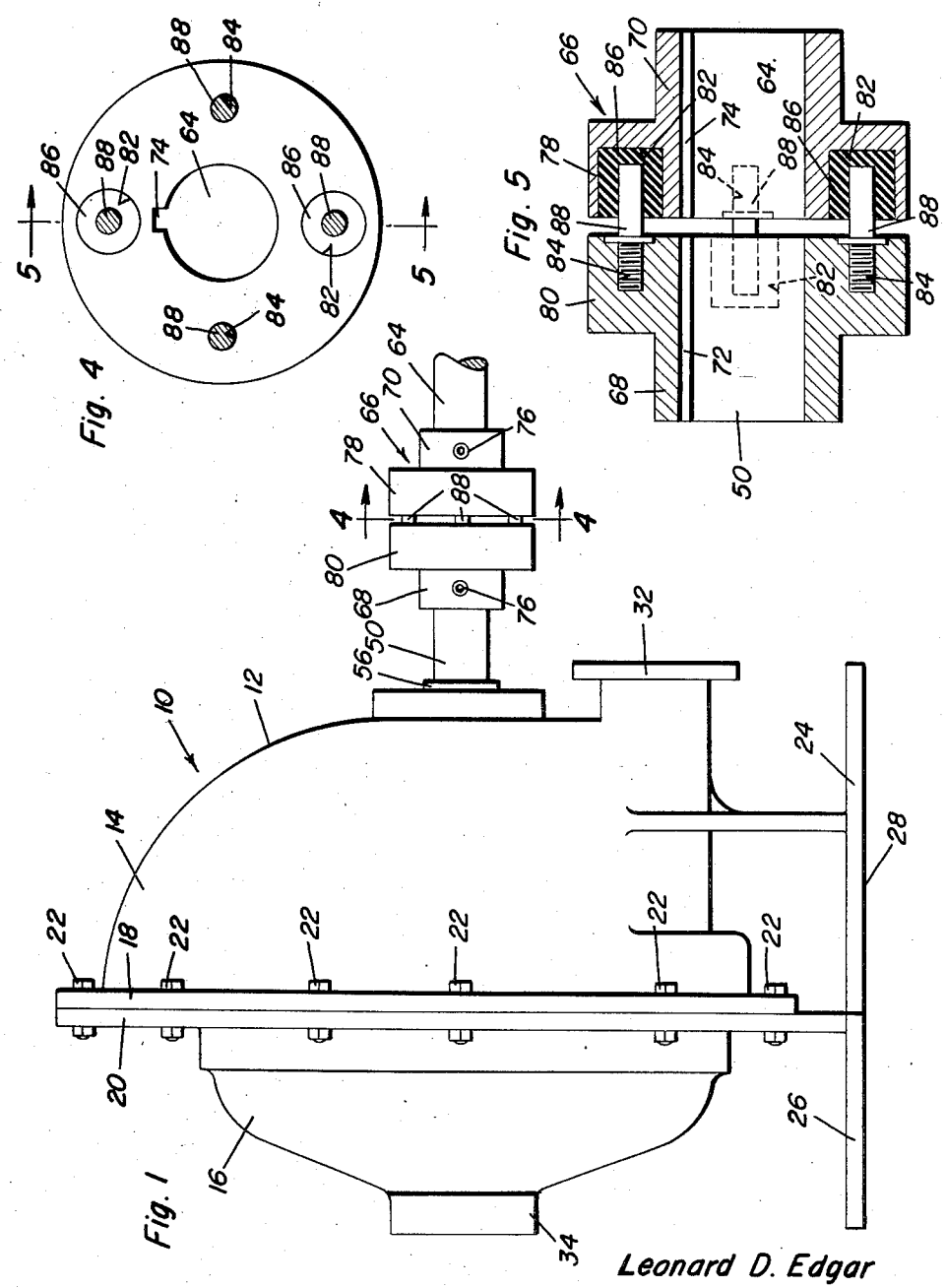
Figure 1 is a side elevational view of the novel pulverizer-grinder.

The novel pulverizer-grinder is indicated generally at 10 and includes a housing 12 comprised of a pair of separable portions 14 and 16 which include outwardly extending flange portions 18 and 20, respectively, having suitable aperture portions therein which are for accommodating suitable nut and bolt assemblies 22 for securing the two housing portions 14 and 16 together. The housing portions 14 and 16 may have integrally formed therewith suitable lower base portions 24 and 26 which cooperate to form a lower support base 28 which may be secured in any suitable manner to a support surface.

The housing portion 14 includes therein a passage portion 30 the outer end 32 being connectable to a suitable source of material to be pulverized. The housing portion 16 includes an outlet opening 34 which is connectable to a suitable suction or vacuum source whereby pulverized material is drawn through the pulverizer-grinder. Extending across the interior of the housing 16 is a partition wall 36, see Figure 2, which may be said to define an intake compartment 38 of the housing portion 14, and an outlet compartment 40 in the housing portion 16. On the side 42 of the partition wall 36 is a bearing recess portion 44 supporting therein a suitable bearing assembly 46 which rotatably supports one end of a driveshaft 48 and opposite end portion 50 thereof being rotatably supported in the bearing assembly 52 carried in a bearing recess portion 54 included in the housing portion 14 in axial alignment with the bearing recess 44.

The shaft 48 is retained in a relatively fixed position within the housing 12 by means of an annular collar thereon engageable with a portion of the bearing assembly 52, the opposite end of the shaft being threaded as seen at 56 and having secured thereon a suitable washer 58 and securing nut 60 which after being adjusted is retained in position by means of a suitable cotter pin fastener 62 which extends through the suitable transverse aperture portion in the shaft 50.

The shaft 50 will be driven at very high speeds, sufficiently fast for affording the desirable and the maximum pulverizing, the driving source for the shaft being of any conventional nature, the driveshaft 50 being connected to a driving shaft 64 of the driving motor (not shown) by means of a flexible coupling assembly 66 for overcoming sudden torque applied to the shaft 50 when the motor is started.

As seen in Figures 1, 4 and 5, the flexible coupling 66 includes a pair of oppositely disposed connecting sleeve portions 68 and 70 which are keyed upon the shafts 50 and 64, respectively, by means of suitable integral longitudinally extending key portions 72 and 74 on the respective shafts, the sleeve portions 68 and 70 having extending therethrough transverse setscrews 76 which are engageable with the respective shafts upon which they are mounted for preventing longitudinal movement of the sleeve portions thereon. The sleeve portions 68 and 70 each include an annular flange portion 78 and 80 which are spaced from each other, see Figure 5, each of which including a pair of diametrically disposed recess portions 82 which have disposed at 90° thereto a pair of diametrically opposed tapped stud receiving recess portions 84, the recess portions 82 being filled with a suitable resilient material such as live rubber etc., indicated at 86 which receives one end of a coupling stud 88, the other end of which being suitably threaded and fixedly secured in the tapped portions 84. Thus it will be seen that the shafts 50 and 64 are coupled together by means of the coupling studs 88 and sudden starting up of a driving motor applying torque to the shaft 64, damage will be prevented to the shaft 50 due to excessive application of torque by means of the coupling studs 88 and their resilient engagement in the aperture portions 82.

Thus the shaft 50 extends normal to the partition wall 36 in housing 16. The shaft 50 includes adjacent the side 90 of the partition wall 36 an enlarged hub portion 92 which is integral with the shaft 50 and which includes a laterally extending groove portion 94 reciprocably receiving therein a key element 96 which is secured to a suitable aperture portion in a rotary cutting plate 98 contained in the inlet compartment 38, said cutter plate being longitudinally movable on the hub 92 by virtue of the groove and key 94 and 96, respectively, the housing 14 including on a lower portion thereof a suitable arcuate recess portion 100 for accommodating the lower portion of the cutter plate 98.

Figure 2:
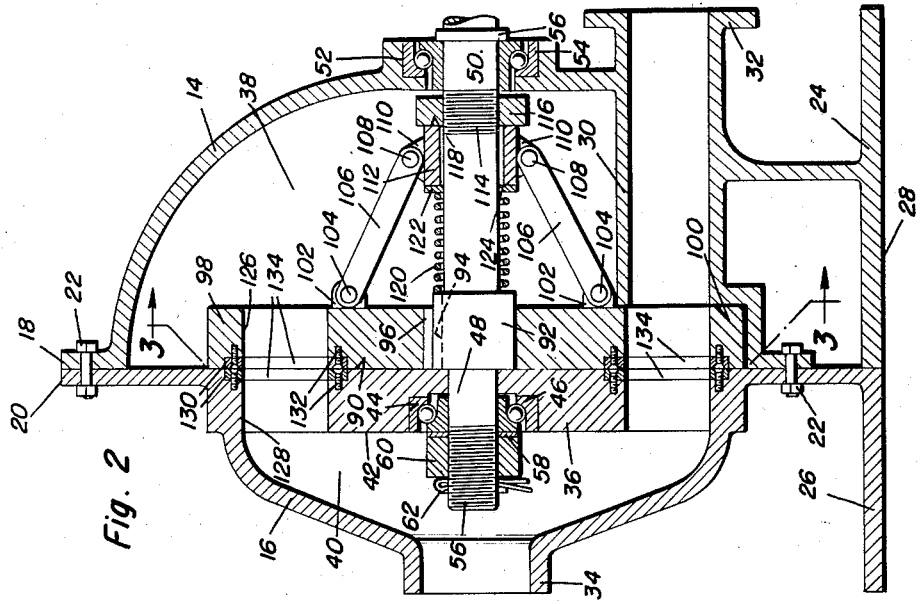
Figure 2 is a vertical sectional view through the center of the novel pulverizer-grinder with the coupling to a driveshaft removed.

The cutter plate 98 includes a plurality of outwardly directed connecting ear portions 102 (only two being shown) which are connected by means of suitable connecting pins 104 to link elements 106, the other end of the link pins 106 being connected by means of suitable connecting pins 108 to connecting ears 110 of an adjusting sleeve element 112 concentrically disposed upon the shaft 50. The shaft 50 has a micrometer threaded portion 114 upon which an adjusting nut 116 is threaded, said adjusting nut being engageable with a side portion 118 of the adjusting sleeve 112 for positioning the relative distance of the rotary cutter plate 98 from the partition wall 36 for a purpose to become subsequently apparent, and a shock absorbing compression spring 120 has one end engageable with a suitable washer element 122 engaged with the opposite side 124 of the adjusting sleeve, the other end of the compression spring 120 being engaged with the hub 92 on the shaft 50. Thus it will be seen that when the adjusting nut 116 is moved toward the right, as seen in Figure 2, the spring engaged with the hub 92 will urge the adjusting sleeve 112 toward the right thus positioning the rotary cutter 98 relative to the fixed intermediate wall 36.

Figure 3:
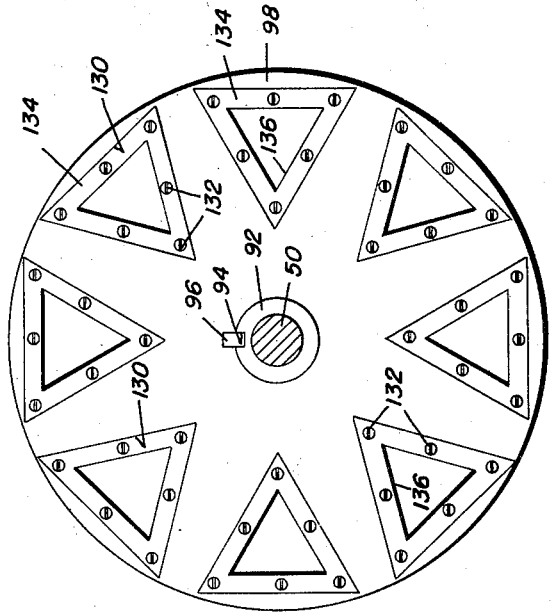
Figure 3 is a sectional view taken substantially on line 3—3 showing in elevation the rotary cutter plate.

The fixed wall 36 and the rotary cutter plate 98 include a plurality of triangular apertures extending therethrough indicated at 126 and 128, respectively, which respectively communicate with each other and with the intake compartment 38 and the outlet compartment 40. The aperture portions 126 and 128, see Figures 2 and 3, each include a triangular marginal recess 130 into which are secured by means of fastening screws 132 triangular cutter elements 134 which define a triangular cutter opening 136 adjacent the aperture portions 126 and 128. Thus, material drawn in through the intake portion 30 as seen by the direction arrows by virtue of the rapid rotation of the rotary cutter plate 98 is pulverized by the adjacent cutter elements 134 and finally is drawn out of the outlet 34 in the housing 16.

There has been accordingly disclosed a novel pulverizer-grinder which fully conforms with the objects of invention heretofore set forth.

Various positional directional terms such as "front," "rear," "top," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A suction operated rotary pulverizer-grinder comprising a housing having sides and a material inlet in communication with one side and a suction outlet in communication with an opposite side of said housing, a fixed partition wall dividing said housing into inlet and outlet compartments, said partition wall having a plurality of apertures, each aperture including a peripheral cutting edge adjacent to the inlet compartment, a rotary support shaft extending through the inlet compartment and normal to said partition wall, means fixing said shaft axially in said housing, a rotary cutter plate mounted on said shaft, means mounting said cutter plate on said shaft for rotary movement therewith in parallel relation to the partition wall and for axial sliding movement on said shaft, adjusting means on said shaft and rotary cutter plate to adjust said plate on said shaft toward said wall, said adjusting means comprising a plurality of links, a sleeve slidably disposed on said shaft, the inner ends of said links secured to said rotary cutter plate, the outer ends of said links secured pivotally to said sleeve, a nut threaded on said shaft and contacting one surface of said sleeve, a spring on said shaft contacting an opposite surface of said sleeve and said plate mounting means for opposing the adjustment of said sleeve in one direction on said shaft, said rotary cutter plate having a plurality of apertures alignable with the apertures of the partition wall, and said apertures in the cutter plate including a peripheral cutting edge adjacent to the peripheral cutting edges of the apertures in the partition wall.

2. The suction operated rotary pulverizer-grinder of claim 1 wherein said means fixing said shaft axially in said housing include a securing nut on said shaft, a fastener coacting with said securing nut and said shaft and holding said securing nut in a selected, adjusted position on said shaft, and a bearing against which said securing nut reacts and carried by said partition wall and within which said shaft is mounted.

References Cited in the file of this patent

UNITED STATES PATENTS

| 274,209 | McCully | Mar. 20, 1883 |
| 1,499,233 | Lenart et al. | June 24, 1924 |
| 2,619,211 | Belden | Nov. 25, 1952 |

FOREIGN PATENTS

| 126,770 | Sweden | Sept. 22, 1949 |
| 171,821 | Germany | June 8, 1906 |